Nov. 24, 1936. M. C. SPENCER 2,061,600
INTERNAL COMBUSTION ENGINE
Filed March 7, 1934 2 Sheets-Sheet 1

Inventor,
Millard Cole Spencer,
By  
Attorney.

Nov. 24, 1936.  M. C. SPENCER  2,061,600
INTERNAL COMBUSTION ENGINE
Filed March 7, 1934   2 Sheets-Sheet 2
Fig. 2.
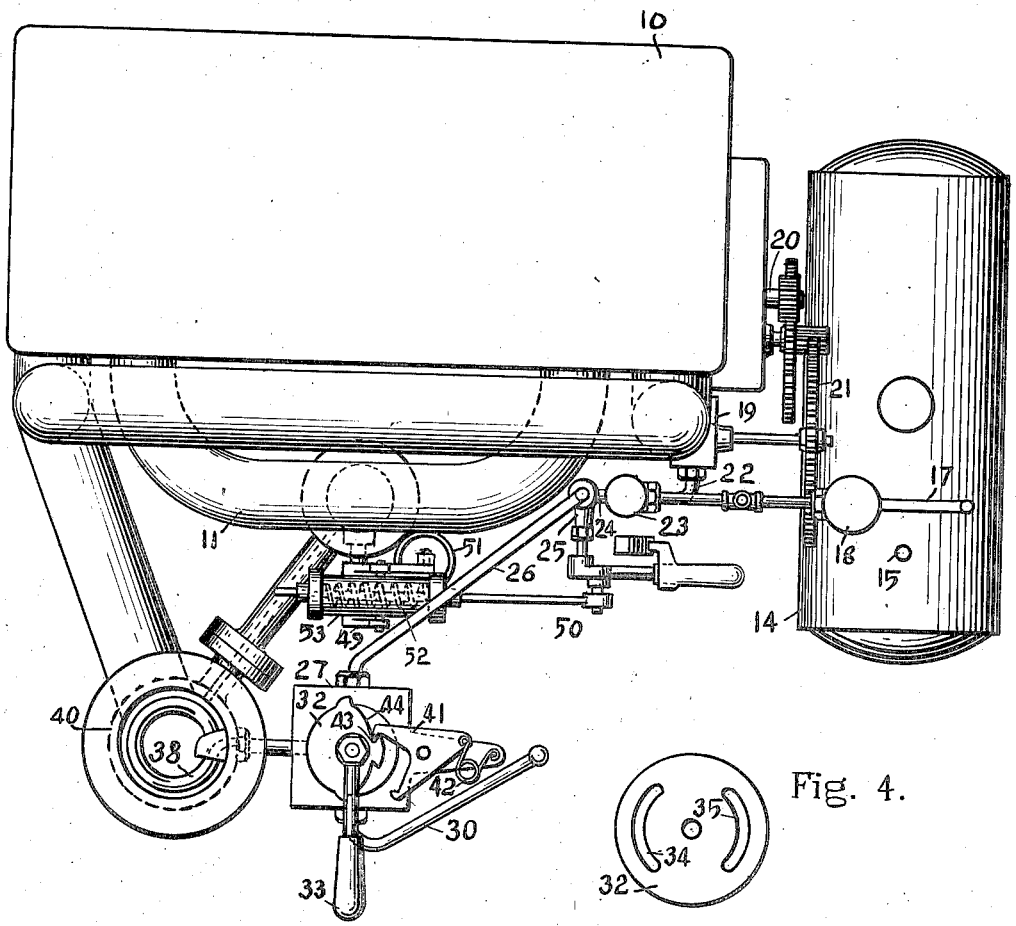
Fig. 4.
Fig. 3.
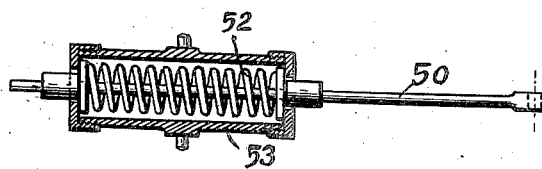
Fig. 5.
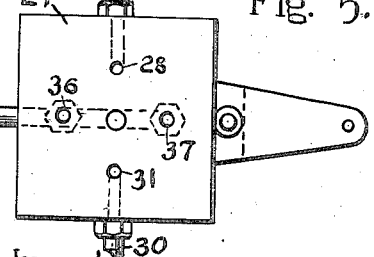
Inventor,
Millard Cole Spencer,
By Samuel W. Balch
Attorney.

Patented Nov. 24, 1936

2,061,600

UNITED STATES PATENT OFFICE 2,061,600

INTERNAL COMBUSTION ENGINE

Millard Cole Spencer, East Orange, N. J., assignor to Crocker-Wheeler Electric Manufacturing Company, Ampere, N. J., a corporation of New Jersey Application March 7, 1934, Serial No. 714,382

6 Claims. (Cl. 123—133)

This invention relates particularly to an engine with a vaporizer by which the heavier hydrocarbon oils may be utilized as fuel, such as is set forth in United States Letters Patent dated June 12, 1934, No. 1,963,035, issued on my application.

In this engine the liquid fuel conduit has a pair of sections heated to a relatively high temperature to which the liquid is supplied alternately by a forced feed and air is supplied alternately with the supply of liquid, the liquid being converted into vapor with reduction of its carbon content and rendered suitable for the engine, and the air being used to burn out the carbon deposited in the sections.

Objects of the invention are to provide means for concurrently adjusting the supply of air and liquid fuel, whereby a mixture of constant proportion is maintained and the proportion of which will not vary with the speed of the engine at different adjustments of the admission valves by reason of the pressure of the liquid and of the suction of the air at the valves being kept proportional to the speed of the engine.

Further objects are to provide means for insuring the periodic alternation of liquid and air in each conduit section whereby liquid will not be run continuously in either section for such length of time that there will be a deposit of carbon sufficient to impair operation or to choke the section.

In the accompanying two sheets of drawings which form a part of this description, Figure 1 is an elevation with parts in section of a portion of an internal-combustion engine in connection with a vaporizer and valves which embody this invention.

Fig. 2 is a top view of the same in which the parts above the line II—II of Fig. 1 are omitted.

Fig. 3 is a section through the spring-barrel of the delay-action mechanism for the air-regulating valve in relation to the liquid-regulating valve.

Fig. 4 is a view of the fourway hand valve from underneath for the change in air and liquid between the conduit sections.

Fig. 5 is a top view of the fourway valve seat.

Figure 1:
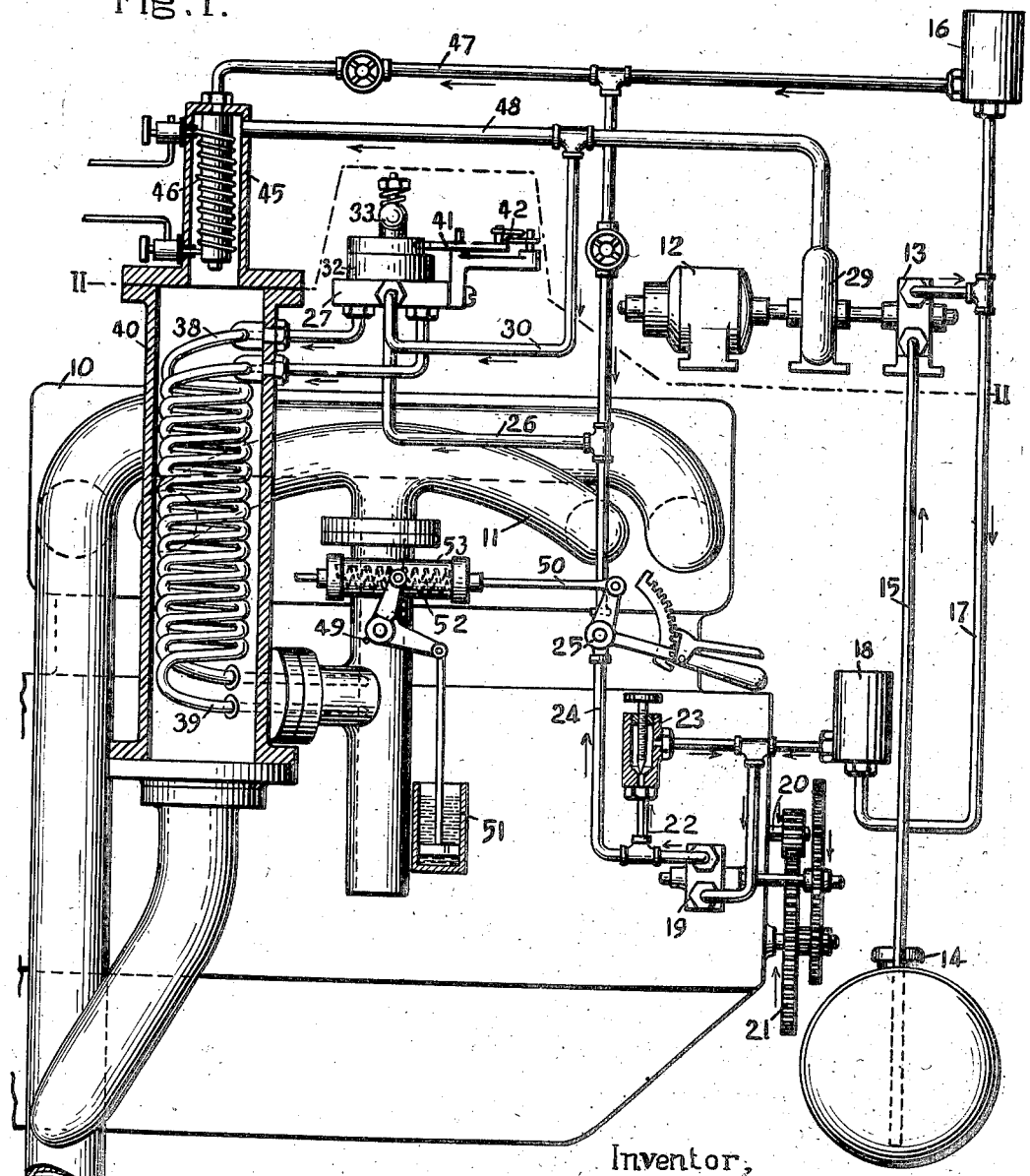

The engine 10 has the usual intake manifold 11. Electric power is provided in the usual manner by a generator driven from the engine and a storage battery not shown, and through an electric motor 12 and liquid pump 13 the liquid fuel is lifted from a tank 14 through a pipe 15 to an elevated tank 16. From this it feeds through a pipe 17 and the usual float valve 18 to a pressure pump 19 which is driven from the camshaft 20 of the engine. The pump circulates the liquid through a bypass 22 which is throttled by a choke valve 23. The leakage of the pump provides some of the bypass, and the choke valve is adjusted for such additional bypass as may be required. The pressure will be proportional to the engine speed through the required range with proper adjustment. From the pump outlet a liquid-supply conduit 24 leads through a liquid-regulating valve 25. As the amount of liquid drawn through this valve is small in comparison to what passes through the bypass, the pressure at the regulating valve will depend chiefly on the rate at which the engine runs and the rate at which the liquid is circulated and the pressure will not vary materially with the amount of opening of the regulating valve.

From the liquid-regulating valve the liquid is supplied through a pipe 26 to a fourway-valve seat 27 and connected to a liquid-inlet port 28 in the fourway-valve seat. The electric motor also drives a blower 29. The motor and the blower will be larger in proportion to the rest of the apparatus than they are shown on the drawings. From a blower a pipe 30 leads to an air-inlet port 31 in the fourway-valve seat. A fourway-disk valve 32 rests on the valve seat and is provided with a handle 33 for its operation. When turned forty-five degrees to either side of the position shown, which is the closed position, one of the arc-shaped grooves 34 or 35 in the face of the fourway-disk valve connects the liquid-inlet port with an outlet port 36 or 37, and the other groove connects the air-inlet port with the other outlet port in the fourway-valve seat. The outlet ports connect to a pair of conduit sections 38 and 39 in a retort 40. Turning of the handle from one side to the other reverses the connections, and in the mid-position the connections are cut off. An anchor ratchet 41 is held in either one of two engaging positions by a spring 42 and engages one of a pair of stops 43 on the valve and latches the valve at mid-position against return but permits opening to the other side. On such opening one of a pair of cams 44 rocks the anchor ratchet to the other engaging position. Therefore, each time after the ports have been closed by bringing the handle to mid-position the fourway valve can be opened only to the reversed connections, thereby insuring the supply of liquid and of air alternately to the conduit sections in the retort after each closing down. It is not essential with this type of fourway hand valve in combination with the retort that the vaporized or conditioned liquid should be delivered to an engine and the liquid need not thus be subsequently utilized.

The retort has an extension 45 with an electric heating coil 46 to vaporize and condition and ignite the liquid fuel for starting the burner. The heating coil is supplied from the battery or generator. The liquid fuel is brought to this extension through a pipe 47 from the elevated tank and air is brought through a pipe 48 from the blower. In starting, the heating coil is raised to a temperature sufficient to vaporize and ignite the liquid fuel. After the retort becomes heated, the current may be cut off from the heating coil.

The liquid fuel passes through one of the pair of conduit sections while air is passed through the other conduit section to burn out the carbon deposited therein from the previous passage of liquid fuel. This form of fourway hand valve instead of an automatically operated fourway valve may be used under conditions where, as in ordinary automobile service, continuous operation will not be required for such length of time that enough carbon would be deposited to impair operation or choke the section. After each stopping and closure of the fourway valve the imposed reversal of the connections shifts the liquid fuel to the cleared conduit section and turns air into the section in which carbon was deposited during the preceding run and burns out the carbon. The outlet ends of the conduit sections lead into the intake manifold.

It is not essential that the conduit sections should be limited to two or located in the same retort and subjected to the same temperature conditions whether liquid or air is passing, or that the air should be passed continuously. However, it is useful to pass the air continuously when the engine is running and to discharge the heated air into the manifold to help keep the vapor from condensing before reaching the engine.

An air-regulating valve 49 in the intake manifold regulates the admission of air to the manifold into which it is drawn by the suction of the engine. This air-regulating valve and the liquid-regulating valve are connected by a rod 50 so that they will, at all adjustments and at all speeds, admit air and liquid in the proper proportion. The same proportion of air and liquid will be maintained at all engine speeds since both the air suction and the liquid pressure are proportional to the engine speed. When the liquid-regulating valve is changed, on account of the fluid liquid and its vapor having to traverse a section of the retort, a few seconds will elapse before the change will be manifest at the manifold. The action of the air-regulating valve is accordingly delayed in both opening and in closing by connection with a dashpot 51. To permit of this delay after the new setting of the liquid-regulating valve, a spring 52 in a spring-barrel 53 is inserted in the connection between the valves.

I claim:

1. In combination with an internal-combustion engine, an air-inlet associated therewith, a vaporizer, a conduit with a section passing through the vaporizer for supplying liquid fuel to the engine, means for supplying liquid to the conduit, an air-regulating valve for the inlet, a liquid-regulating valve for the conduit, a connection between the valves for concurrent operation, a spring in the connection, and a dashpot for delaying the operation of the air-regulating valve when the liquid-regulating valve is operated.

2. In combination with an internal-combustion engine, an air-inlet associated therewith whereby air is drawn in proportional to the speed of the engine, a vaporizer, a conduit for supplying liquid fuel, a liquid pump with a throttled bypass driven from the engine for supplying the liquid to the conduit under pressure substantially proportional to the speed of the engine, an air-regulating valve for the inlet, a liquid-regulating valve for the conduit, a section of the conduit beyond the liquid-regulating valve which passes through the vaporizer for supplying vaporized fuel to the engine, a connection between the valves, a spring in the connection, and means for delaying the operation of the air-regulating valve when the liquid-regulating valve is operated.

3. In combination with an internal-combustion engine, an air-inlet associated therewith whereby air is drawn in proportional to the speed of the engine, a vaporizer, a conduit for supplying liquid fuel, a liquid pump with a throttled bypass driven from the engine for supplying the liquid to the conduit under pressure substantially proportional to the speed of the engine, an air-regulating valve for the inlet, a liquid-regulating valve for the conduit, a pair of conduit sections beyond the liquid-regulating valve which pass through the vaporizer for supplying vaporized fuel to the engine, a connection between the valves, a spring in the connection, and means for delaying the operation of the air-regulating valve when the liquid-regulating valve is operated.

4. In combination with a vaporizer for conditioning fluid, a pair of conduit sections associated therewith, a fourway hand valve with a closed position, a first open position in which the liquid is supplied to one of the sections and air is supplied to the other section and a second open position in which the liquid is supplied to the section to which air was supplied in the first open position and air is suppled to the section to which the liquid was supplied in the first open position, and means operative when the valve is closed from either open position to prevent its return to the same open position until it has been moved to the other open position.

5. In combination with an internal-combustion engine having a vaporizer for conditioning its liquid fuel and having a pair of conduit sections associated therewith, a fourway hand valve with a closed position, a first open position in which the liquid is supplied to one of the sections and air is supplied to the other section and a second open position in which the liquid is supplied to the section to which air was supplied in the first open position and air is suppled to the section to which the liquid was supplied in the first open position, and a ratchet anchor operative when the valve is closed from either open position to prevent its return to the same open position until it has been moved to the other open position.

6. In combination with an internal-combustion engine, an air inlet associated therewith, a vaporizer, a conduit with a section passing through the vaporizer for supplying liquid fuel to the engine, means for supplying liquid to the conduit, an air-regulating valve for the inlet, a liquid-regulating valve for the conduit located for regulation of the liquid prior to its entrance into the section through the vaporizer, a connection between the valves for concurrent operation, and means for delaying the operation of the air-regulating valve when the liquid-regulating valve is operated.

MILLARD COLE SPENCER.